(12) United States Patent
Nakamoto (10) Patent No.: US 9,896,135 B2
(45) Date of Patent: Feb. 20, 2018

(54) VEHICLE BODY FRONT STRUCTURE

(71) Applicant: HONDA MOTOR CO., LTD., Tokyo (JP)

(72) Inventor: Naoki Nakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/390,870

(22) Filed: Dec. 27, 2016

(65) Prior Publication Data
US 2017/0197662 A1 Jul. 13, 2017

(30) Foreign Application Priority Data
Jan. 7, 2016 (JP) .................................. 2016-001990

(51) Int. Cl.
| B62D 25/08 | (2006.01) |
| B62D 25/20 | (2006.01) |
| B62D 21/15 | (2006.01) |
| B62D 21/02 | (2006.01) |
| B62D 21/12 | (2006.01) |
| B62D 27/06 | (2006.01) |

(52) U.S. Cl.
CPC ......... *B62D 25/2018* (2013.01); *B62D 21/02* (2013.01); *B62D 21/12* (2013.01); *B62D 21/155* (2013.01); *B62D 27/06* (2013.01)

(58) Field of Classification Search
CPC ...... B62D 21/02; B62D 21/12; B62D 21/155; B62D 27/06; B62D 25/08; B62D 25/2018

USPC ....... 296/203.01, 203.02, 204, 187.09, 187.1
See application file for complete search history.

(56) References Cited

U.S. PATENT DOCUMENTS 5,605,353 A * 2/1997 Moss ..................... B62D 21/09
 188/376
2007/0257519 A1* 11/2007 Hanson, Jr. .......... B62D 21/157
 296/204

FOREIGN PATENT DOCUMENTS

JP 2013-248982 A 12/2013

* cited by examiner

*Primary Examiner* — Dennis H Pedder
(74) *Attorney, Agent, or Firm* — Westerman, Hattori, Daniels & Adrian, LLP (57) ABSTRACT

A vehicle body front structure has: a front side frame; a lateral member; a sub frame; a sub frames attaching portion for fastening the rear end portion of the sub frame. The lateral member has a lateral member main body which has a hole portion formed on a bottom wall, and a stiffening member which is made of a material with lower tensile strength than the lateral member main body, layered on the bottom wall of the lateral member main body, joined to the inside of the lateral member main body, and simultaneously in which a fastening nut is disposed in the upper direction. The hole portion has a large-diameter hole with a larger diameter than the fastening nut, a notched portion notching the edge of the large-diameter hole. The stiffening member has a recessed wall portion recessed downward corresponding to the hole portion.

13 Claims, 8 Drawing Sheets

VEHICLE BODY FRONT STRUCTURE

CROSS REFERENCES TO RELATED APPLICATIONS

The present application claims priority under 35 U.S.C. § 119 to Japanese Patent application No. 2016-001990, filed Jan. 7, 2016, entitled "Vehicle Body Front Structure." The contents of this application are incorporated herein by reference in their entirety.

TECHNICAL FIELD

The present disclosure relates to a vehicle body front structure.

BACKGROUND

Vehicles including automobile have right and left front side frames, sub frames provided in the lower direction of the right and left front side frames, and right and left lateral members extending from the respective rear end portions of the right and left front side frames to the inside in the width direction of the vehicle, as skeleton members on the front portion of the vehicle body.

Moreover, as for the vehicle body front structure in Japanese Laid-Open Patent Publication No. 2013-248982, a fastening nut is provided inside a lateral member, and the fastening nut is screwed with a fastening bolt penetrating the rear end portion of the subframe and the lateral member from the lower direction of the sub frame.

Therefore, a bottom wall of the lateral member functions as a sub frame attaching portion which is fastened to the fastening nut for attaching the sub frame.

Moreover, in the above mentioned structure, the sub frame is attached to the front side frame and the lateral member. This may prevent, when the vehicle is collided from the front direction, the front side frame from bending to absorb the collision energy.

Therefore, as for the vehicle body front structure in Japanese Laid-Open Patent Publication No. 2013-248982, when the vehicle receives the collision load from the front direction, the load is applied, so as to release the attachment of the rear end portion of the sub frame. Namely, the downward load is applied on the fastening nut and the fastening nut falls off from the lateral member.

Furthermore, the lateral member in Japanese Laid-Open Patent Publication No. 2013-248982 has a lateral member main body, and a stiffening member which is layered on and joined to the bottom wall of the lateral member main body. An escape hole portion which has a larger diameter than the fastening nut is formed on the stiffening member.

Therefore, the bottom portion of the lateral member has a region which is formed with a single layer of the lateral member main body, and a region which is formed with two layers made of the lateral member main body and the stiffening member.

Moreover, the region with a single layer has a fastened region which is fastened by a fastener, and an annular weal, portion positioned between the fastened region and the region with the two layers.

As mentioned above, when the downward load is applied on the fastening nut, the weak portion is broken and the fastening nut certainly falls off from the lateral member.

SUMMARY

However, since the above mentioned lateral member has the lateral member main body and the stiffening member, which are heavy, it is preferable to reduce in weight.

The present disclosure has been made under the above mentioned circumstances. It would be preferable to provide a vehicle body front structure which has a lateral member reduced in weight.

In one aspect, a vehicle body front structure comprises: a front side frame extending to the longitudinal direction; a lateral member extending from the rear portion of the front side frame to the inside in the width direction of the vehicle; a sub frame disposed below the front side frame; and a sub frame attaching portion provided on the bottom wall of the lateral member and fastening the rear end portion of the sub frame, the lateral member comprises: a lateral member main body in which a hole portion is formed on the bottom wall; a stiffening member which is made of a material with lower tensile strength than the lateral member main body, layered with the bottom wall of the lateral member main body, joined to the inside of the lateral member main body, and simultaneously, on which a fastening nut is disposed in the upper direction, the hole portion has a large-diameter hole with a larger diameter than the fastening nut, and a notched portion notching an end edge of the large-diameter hole, the stiffening member has a recessed wall portion recessed downward corresponding to the hole portion, and the recessed wall portion has a drain hole corresponding to the notched portion.

The hole portion of the embodiment has a notched hole in addition to a large-diameter hole which corresponds to an escape hole of the conventional art. The notched area is enlarged, and the lateral member reduces in weight.

Due to the fact that the water accumulated above the recessed wall portion is discharged through the drain hole below the lateral member, it is hardly getting rusty.

Moreover, due to the fact that the drain hole is positioned outside the region of the recessed wall portion, which is corresponding to the large-diameter hole (the tightening region fastened by the fastening nut, and a weak portion broken by the load from the lower direction), the rigidity which is required as the sub frame attaching portion is hardly reduced.

Furthermore, the portion fastened by the fastening nut is a recessed wall portion (stiffening member) with a lower tensile strength than the lateral member main body, at the time of collision from the front direction, the fastening nut falls off with high certainty.

Moreover, it is preferable that the lateral member has a blocked plate blocking the side direction of the lateral member main body, the lateral member main body is formed in an approximately hat-shape opened upward in the side view, the stiffening member is joined to a front wall, a rear wall, and a bottom wall of the lateral member main body, the blocked plate has a periphery stiffening portion extending along the periphery of the recessed wall portion and joined to the blocked plate.

According to the above-mentioned configuration, the periphery stiffening portion increases the rigidity in the periphery of the sub frame attaching portion, and the sub frame is stably supported, even though the sub frame attaching portion is positioned so as to be offset from the front side frame.

Moreover, it is preferable that the vehicle body front structure comprises: a floor frame extending from the lateral member to the rear direction; an abutting member joined to the lateral member and the floor frame, and projecting to the lower direction, the sub frame is formed such that the longitudinal center portion bends in an L-shape in the side view so as to shift downward, at the time of collision from the front direction, as the sub frame bends, the rear end of the sub frame shifts upward with a fastened portion as a fulcrum fastened by a fastening bolt so as to abut on the abutting member.

According to the above-mentioned configuration, the sub frame bends. Therefore, as for the part of the sub frame behind the middle in the longitudinal direction, the further front side thereof than the fastened member shifts downward, on the other hand, the further rear side thereof than the fastened portion shifts upward, with a fastened portion as a fulcrum.

When the rear end of the sub frame abuts on the abutting member, the whole part behind the longitudinal center of the sub frame shifts downward with the abutting member as a fulcrum.

Accordingly, due to the principle of leverage, the downward load is applied on the fastening nut and the fastening bolt, and the fastening nut easily falls off from the lateral member.

Furthermore, there is no need for a link mechanism which has been conventionally used.

Moreover, it is preferable that a ridgeline is formed on the lateral member so as to be gradually positioned from the front direction of the recessed wall portion to the rather rear direction as the ridgeline approaches to the front side frame.

According to the above-mentioned configuration, the collision load applied from the front direction on the lateral member is dispersed with the front side frame, which controls the backward movement of the lateral member.

Accordingly, at the time of collision from the front direction, the sub frame bends certainly. Simultaneously, the downward load is applied on the fastening nut and fastening bolt, and the fastening nut falls off from the lateral member.

Moreover, it is preferable that the stiffening member is thicker than the lateral member main body.

According to the above-mentioned configuration, the rigidity of the sub frame attaching portion is increased and the sub frame can be supported.

Moreover, it is preferable that, a front frame of the front side frame has, in order from the front, a clearance portion for avoiding the contact with a wheel disposed outside in the width direction of the vehicle, a front bending portion bending to the inside in the width direction of the vehicle, and a recessed portion formed such that an outside wall outside in the width direction of the vehicle is recessed.

According to the above-mentioned configuration, the front frame alternately bends at the three points (the clearance portion, the front bending portion, and the recessed portion) in the width direction of the vehicle, which allows to efficiently absorb the collision energy.

Moreover, it is preferable that the rear frame of the front side frame comprises: an inclined portion extending downward from a rear portion of the front frame of the front side frame to the rear direction; a horizontal portion horizontally extending from the rear end of the inclined portion to the rear direction, a rear bending portion is formed as an angular portion formed with the inclined portion and the horizontal portion on the rear frame, a stiffener of the outrigger is provided outside in the width direction of the vehicle of the rear bending portion, a rear wall of the lateral member is provided inside the rear bending portion in the width direction of the vehicle, the bending bulkhead is provided inside the rear bending portion so as to be arranged with the stiffener and the rear wall of the lateral member in the width direction of the vehicle.

According to the above-mentioned configuration, the stiffener, the rear wall and the bending bulkhead of the lateral member increase the rigidity of the rear bending portion. Accordingly, even if the vehicle is collided from the front direction, an angle formed with the rear bending portion is kept, which suppresses bending of the inclined portion to to move upward relative to the horizontal portion. As a result, it is suppressed that the deformation of the inclined portion moves the dash lower panel at and above the rear end of the front frame backward (toward the inside of the vehicle).

It is possible to provide the vehicle body front structure with a lateral member which is reduced in weight.

BRIEF DESCRIPTION OF THE DRAWINGS

The advantages of the disclosure will become apparent in the following description taken in conjunction with the following drawings.

FIG. 8(*a*) is a plain view of the lateral member main body. FIG. 8(*b*) is a view showing the state that the lateral member main body is layered with the stiffening member. FIG. 8(*c*) is a sectional view of a VIIIc-VIIIc line in FIG. 8(*b*) in the arrow direction.

DETAILED DESCRIPTION

Next, the vehicle adopting the vehicle body front structure related to the embodiment will be explained with reference to the drawings.

Figure 1:
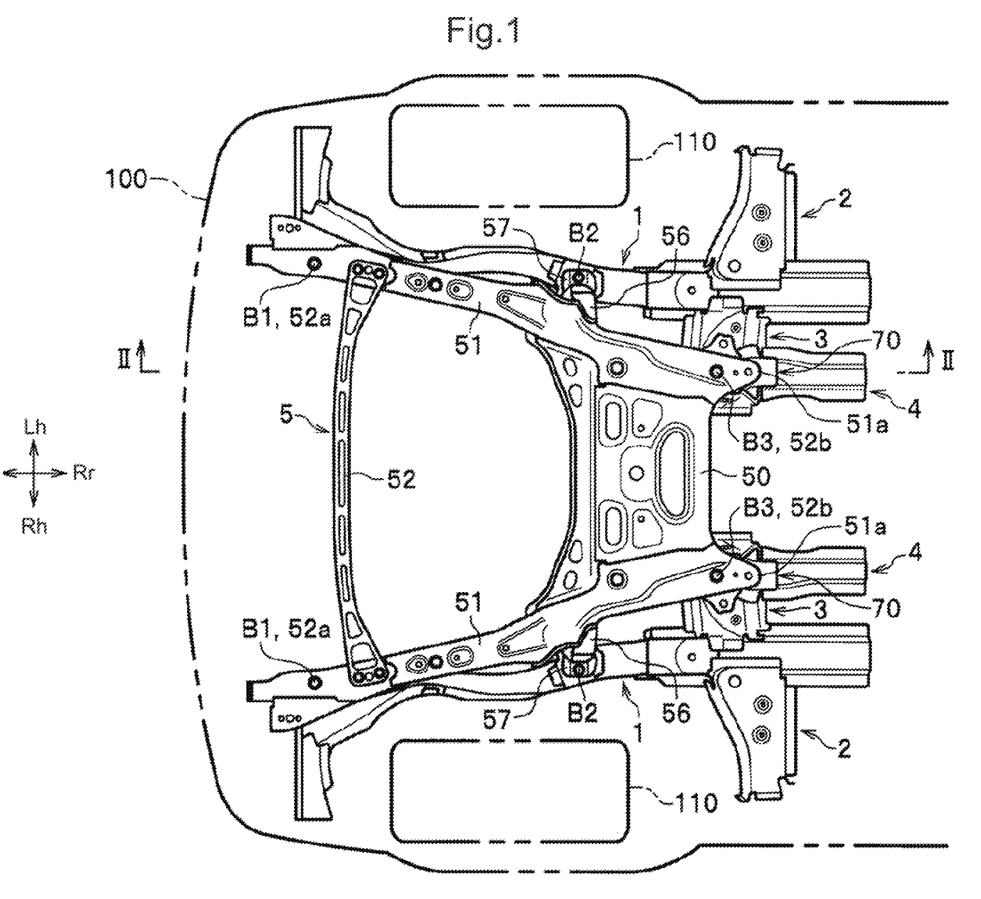
FIG. 1 is a bottom view of the vehicle which adopts the vehicle body front structure in the embodiment, which is seen from the lower direction.

FIG. 1 is a bottom view of the vehicle body front structure which is seen from the lower direction. As shown in FIG. 1, a vehicle 100 as a skeleton member of the body front portion has right and left front side frames 1, 1 extending in the longitudinal direction in further inside in the width direction of the vehicle than front wheels 110, 110, right and left outriggers 2, 2 extending from the rear portion of the right and left front side frames 1, 1 to the outside in the width direction of the vehicle, right and left lateral members 3, 3 extending from the rear portion of the right and left front side frames 1 to the inside in the width direction of the vehicle, right and left floor frames 4, 4 extending backward from the right and left lateral members 3, 3, and a sub frame 5 provided below the right and left front side frames 1, 1.

Moreover, the right and left front side frames 1, 1, the right and left outriggers 2, 2, the right and left lateral members 3, 3, and the right and left floor frames 4, 4 are symmetrically formed, respectively. Accordingly, the following explanation only mentions the left side structure, and omits the right side structure.

Figure 2:
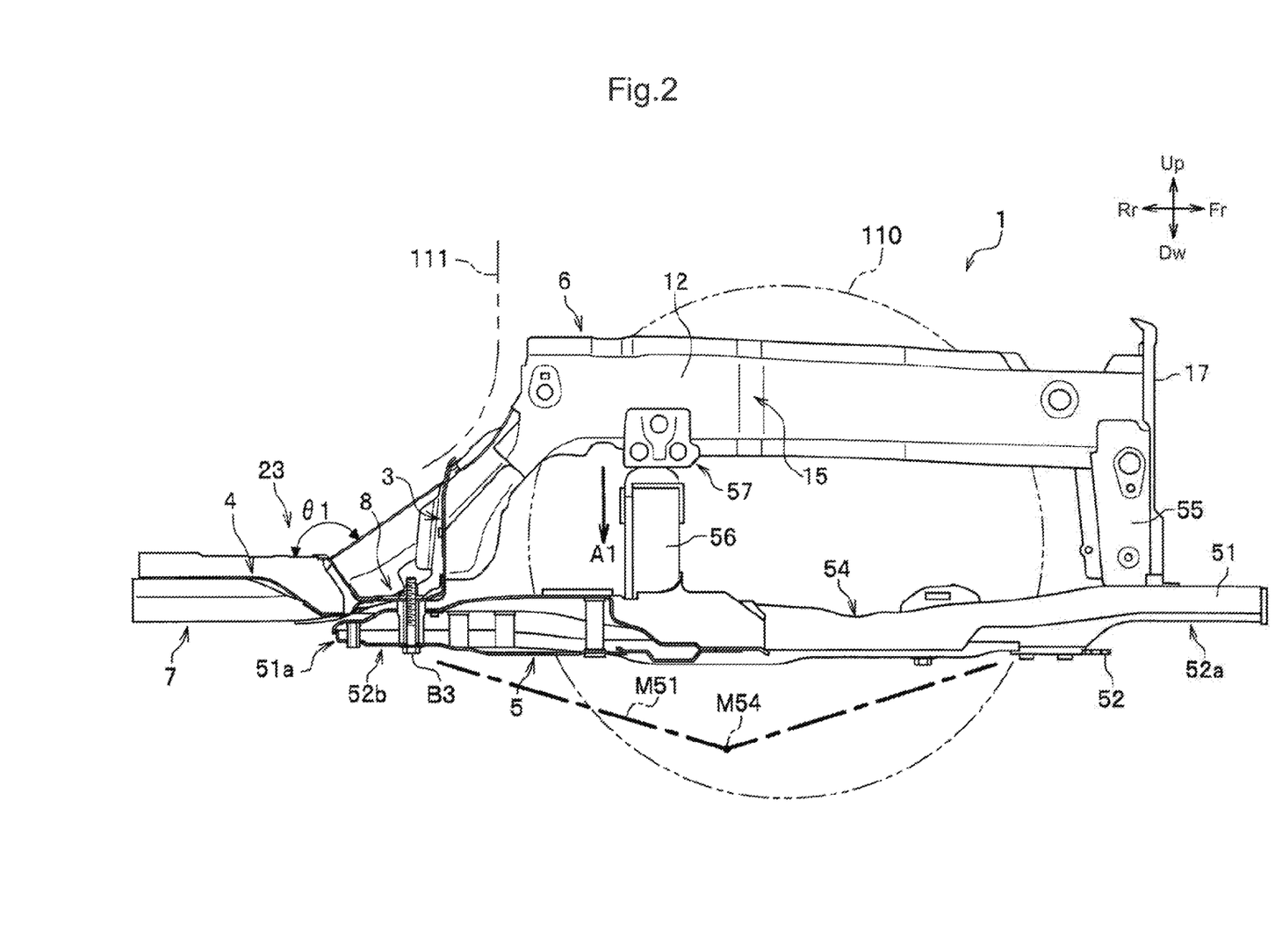
FIG. 2 is a sectional view of a II-II line in FIG. 1 in the arrow direction.

As shown in FIG. 2, the front side frame 1 has a front frame 6 horizontally extending in the longitudinal direction, a rear frame 7 extending downward from the rear end portion of the front frame 6 to the rear direction, and horizontally extending to the rear direction.

Figure 3:
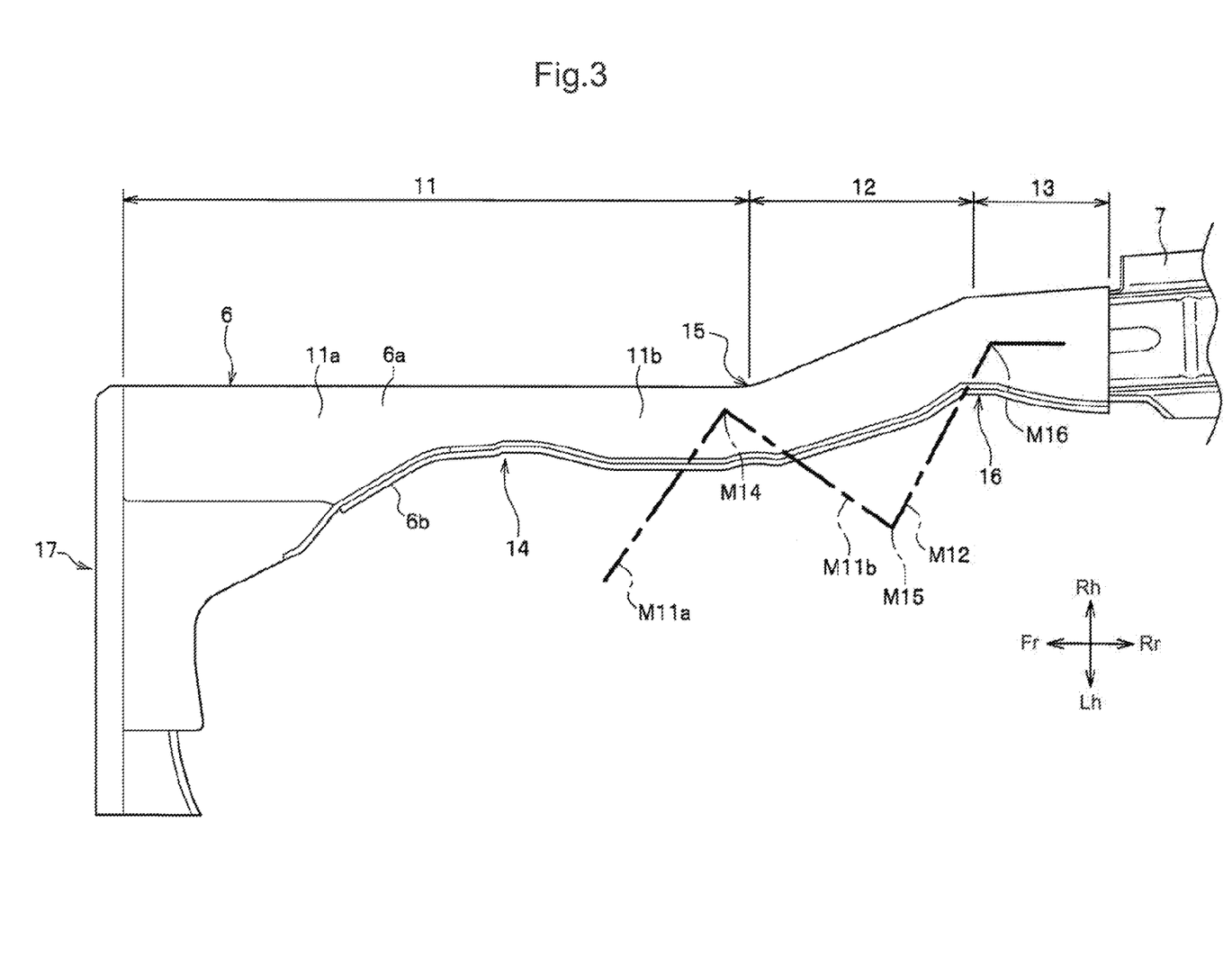
FIG. 3 is a plain view of an enlarged front frame.
Figure 4:
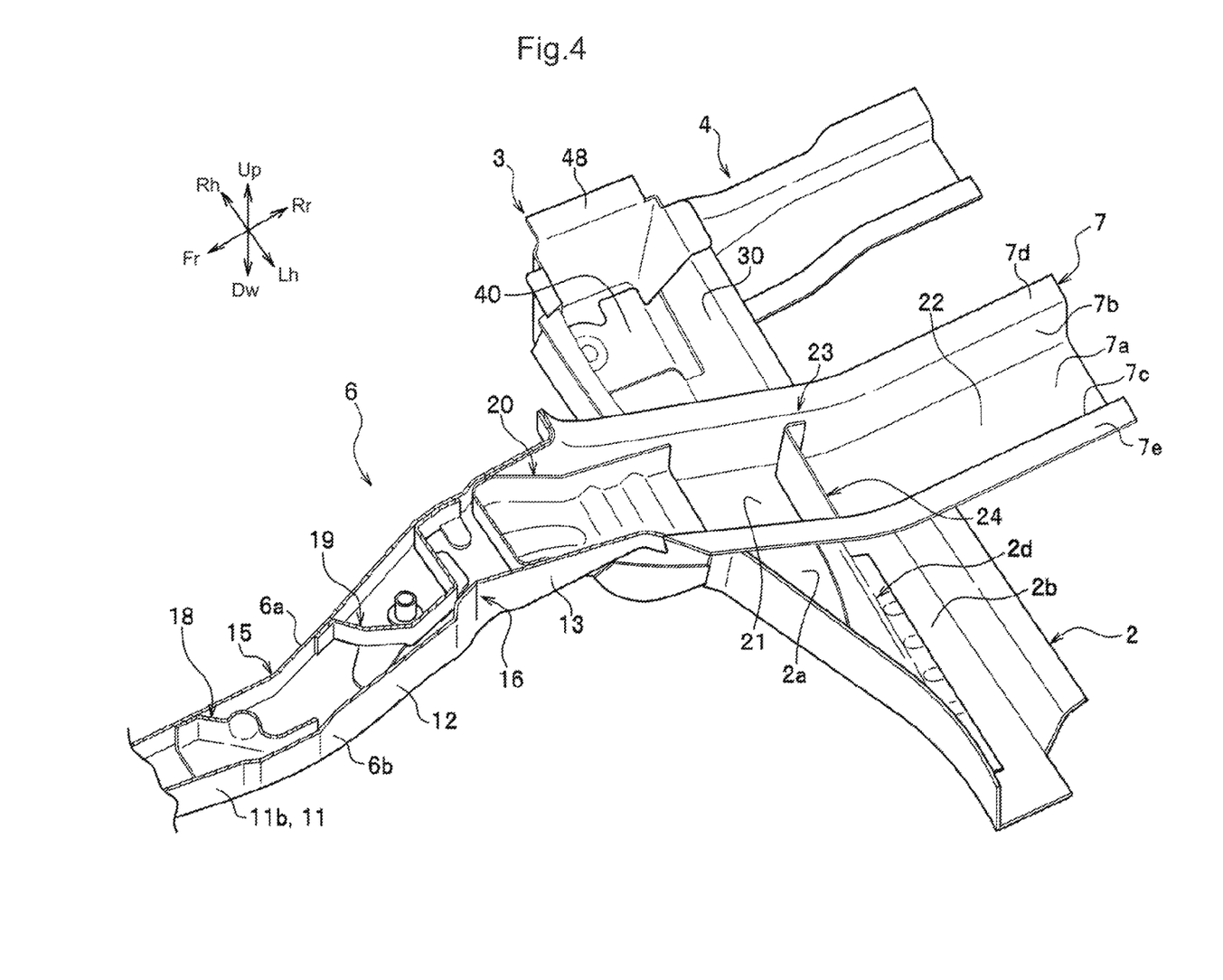
FIG. 4 is a perspective view of the notched upper wall of the front frame, which is seen from the front side and from above in the left side.

As shown in FIGS. 3 and 4, the front frame 6 is formed with an inner frame 6a which has an approximately hat-shape in the cross sectional view, which is opened to the outside in the width direction of the vehicle, and an outer frame 6b welded to the outside of the inner frame 6a in the width direction of the vehicle. Accordingly, the front frame 6 is formed in a closed cross sectional structure with an upper wall, a lower wall, an inside wall, and an outside wall.

As shown in FIG. 4, the rear frame 7 has a bottom wall 7a, an inside wall 7b, an outside wall 7c, a right flange 7d, and a left flange 7e, and has an approximately hat-shape which is opened upward in the cross sectional view.

The front end portion of the rear frame 7 is welded to the rear end portion of the front frame 6. The front frame 6 and the rear frame 7 are integrated.

A dash lower panel 111 (see a two-dot chain line in FIG. 2) and an unillustrated floor panel are jointed to the right flange 7d and the left flange 7e of the rear frame 7. The rear frame 7 has a closed cross sectional structure.

As shown in FIG. 3, the front frame 6 has a first straight line portion 11 linearly extending in the longitudinal direction, a second straight line portion 12 linearly extending from the rear end of the first straight line portion 11 to the inside in the width direction of the vehicle, and a connecting portion 13 which is the rear end portion of the front frame 6, and approximately and linearly extends from the rear end of the second straight line portion 12 to the rear direction, and connects to the rear frame 7.

Moreover, in order from, the front, a clearance portion 14, a front bending portion 15, and a recessed portion 16 are formed on the front frame 6.

The clearance portion 14 is recessed so as to prevent the front frame 6 from contacting with the front wheel 110 (see FIG. 1), and is formed such that the outside wall of the longitudinal center portion of the first straight line portion 11 is curved so as to be recessed to the inside in the width direction of the vehicle.

Accordingly, when the collision load from the front direction is applied on the front frame 6, the stress (compressive stress) can easily concentrate on the clearance portion 14 (outside wall).

Moreover, when the stress deforms (compresses) the clearance portion 14 (outside wall), a front portion 11a of the first, straight line portion 11 bends at the clearance portion 14 as a starting point to the outside in the width direction of the vehicle (see a M11a shown in a two-dot chain line in FIG. 3), which absorbs the collision energy.

The front bending portion 15 is an angular portion which is formed between the first, straight line portion 11 and the second straight line portion 12.

Accordingly, when the collision load from the front direction is applied on the front frame 6, the stress (compressive stress) can easily concentrate on the front bending portion 15 (inside wall).

Moreover, when the stress (compressive stress) can easily concentrate on the front bending portion 15 (inside wall), a rear portion 11b of the first straight line portion 11 bends at the front bending portion 15 as a starting point to the inside in the width direction of the vehicle (see a M11b shown in a two-dot chain line in FIG. 3), which absorbs the collision energy.

The recessed portion 16 is formed such that the outside wall which forms the rear portion of the second straight line portion 12 and the front portion of the connecting portion 13 are recessed to the inside in the width direction of the vehicle.

Accordingly, when the collision load from the front direction is applied on the front frame 6, the stress (compressive stress) can easily concentrate on the recessed portion 16 (outside wall).

Moreover, when the stress deforms (compresses) the recessed portion 16 (outside wall), the second straight line portion 12 bends at the recessed portion 16 as a starting point to the outside in the width direction of the vehicle (see a M12 shown in a two-dot chain line in FIG. 3), which absorbs the collision energy.

Moreover, the recessed portion 16 is positioned between the second straight line portion 12 and the connecting portion 13 bending relative to the second straight line portion 12, in other words, positioned at the inside of the angular portion. The stress can easily concentrate on the recessed portion 16 (outside wall). Accordingly, the second straight line portion 12 bends at the recessed portion 16 as a starting point to the outside in the width direction of the vehicle with high certainty.

Then, the clearance portion 14, the front bending portion 15, and the recessed portion 16 alternately bend to the outside or the inside of the vehicle, which efficiently absorbs the collision energy.

The basic configuration of the front, frame 6 is mentioned as above. Next, the members which are provided on the front frame 6 will be explained.

As shown in FIG. 2, a front attaching arm 55 is provided on the front end portion of the first straight line portion 11 of the front frame 6 which extends downward for attaching the front end portion of the sub frame 5.

A bracket 57 is provided on the lower surface of the second straight line portion 12.

The bracket 57 is provided for attaching a middle attaching arm 56 extending upward from the longitudinal middle portion of the sub frame 5 to the front frame 6, and is connected by a fastener (see a fastening bolt B2 in FIG. 1).

Moreover, when the downward load is applied on the middle attaching arm 56, the middle attaching arm 56 is separated from the bracket 57, and the middle attaching arm 56 falls off from the front side frame 1 (see an arrow A1 in FIG. 2).

As shown in FIG. 3, a load transmitting member 17 extending to the outside in the width direction of the vehicle is provided on the front end of the front frame 6. Accordingly, even if a small overlap collision in which the collision load is input to the outside of the front side frame 1 in the width direction of the vehicle, the collision load is certainly input to the front side frame 1 through the load transmitting member 17.

As shown in FIG. 4, in the order from the front, a bulkhead 18 for the first straight line portion, a front bulkhead 19, and a rear bulkhead 20 are provided inside the front frame 6.

The bulkhead 18 for the first straight line portion is provided inside the rear portion 1ib of the first straight line portion 11, which increases the rigidity of the rear portion 1ib of the first straight line portion 11.

The front bulkhead 19 is provided inside the second straight line portion 12 of the front frame 6, which increases the rigidity of the second straight line portion 12.

The rear bulkhead 20 extends from the connecting portion 13 of the front frame 6 to the inside of the rear frame 7, which increases the rigidity of the part where the front frame 6 and the rear frame 7 are connected.

Moreover, the bulkhead 18 for the first straight line portion, the front bulkhead 19, and the rear bulkhead 20 are longitudinally separated from each other, which does not prevent the rear portion 11b of the first straight line portion 11 (see M11b shown in the two-dot chain line in FIG. 3) and the second straight line portion 12 (see M12 shown in the two-dot chain line in FIG. 3) from bending, when the collision load from the front direction is applied.

As shown in FIG. 4, the rear frame 7 has an inclined portion 21 extending downward from the connecting portion 13 of the front frame 6 to the rear direction, and a horizontal portion 22 horizontally extending from the rear end of the inclined portion 21 to the rear direction. A rear bending portion 23 composed, of the inclined portion 21 and the horizontal portion 22 is formed on the rear frame 7.

A bending bulkhead 24 is provided inside the rear bending portion 23. The bending bulkhead 24 extends along the rear bending portion 23 in the vertical direction and in the lateral direction. The rear bending portion 23 comprises the bottom wall 7a, the inside wall 7b, and the outside wall 7c. The bending bulkhead combines with the bottom wall, the inside wall, and the outside wall, respectively, which increases the rigidity of the rear bending portion 23.

As shown in FIG. 4, the outrigger 2 connects an unillustrated side sill which is disposed outside in the width direction of the vehicle of the rear frame 7 and the rear frame 7. Accordingly, the collision load applied on the rear frame 7 is dispersed with the unillustrated side sill through the outrigger 2.

The outrigger 2 extends to the width direction of the vehicle, has an approximately hat-shape which is opened upward in the cross sectional view, and has a closed cross sectional structure such that the floor panel (not shown) is joined in the upper direction.

Figure 5:
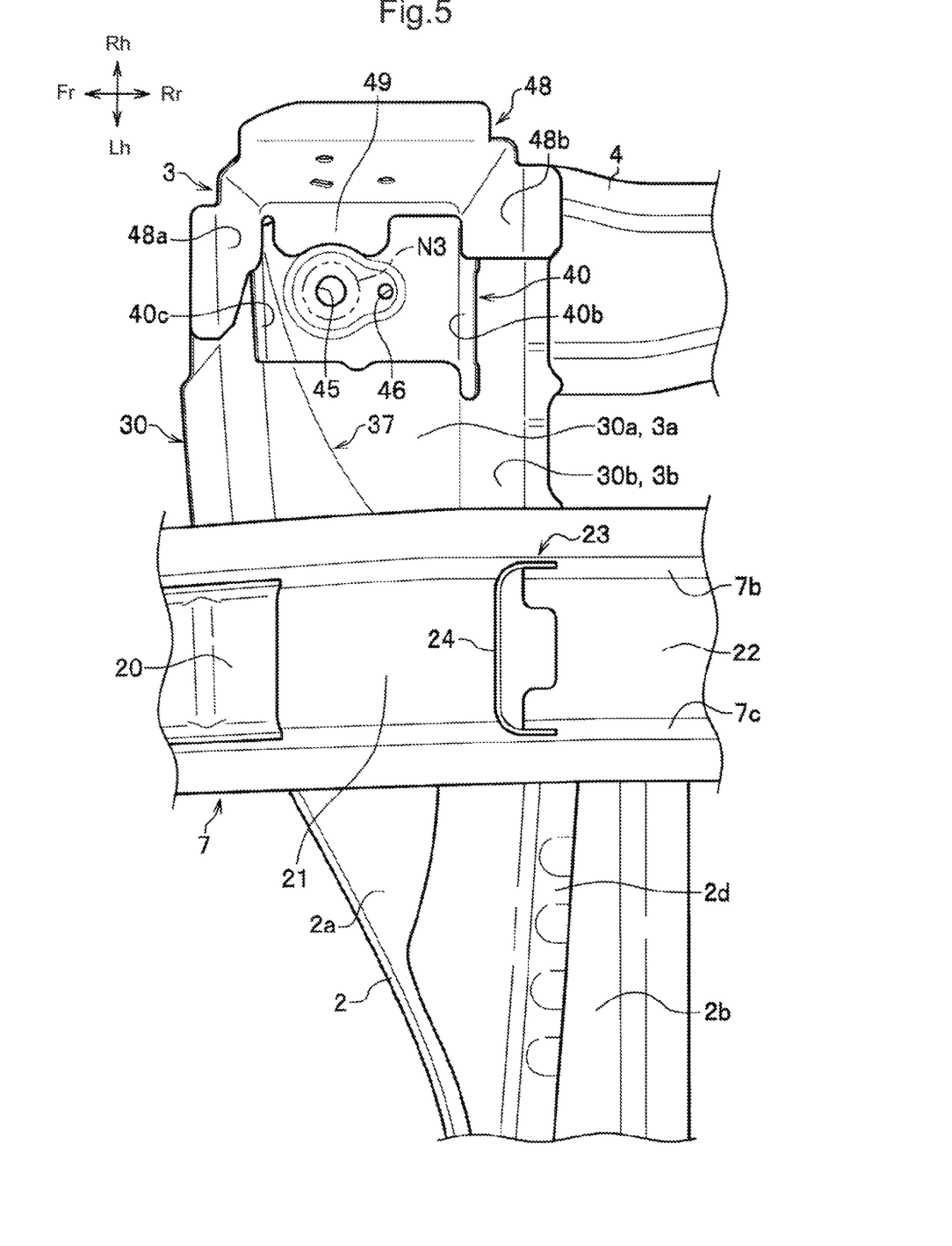
FIG. 5 is a plain view of the rear frame, the outrigger, and the lateral member.

As shown in FIG. 5, the bottom wall of the outrigger 2 forms a step-shape, and has a front, bottom wall 2a, a rear bottom wall 2b, and a vertical wall (not shown) which is positioned between the front bottom wall 2a and the rear bottom wall 2b.

Then, a stiffener 2d which straddles and combines with the front bottom wall 2a, the rear bottom wall 2b, and the vertical wall (not shown) is provided on the outrigger 2, which increase the rigidity.

The end portion of the stiffener 2d inside in the width direction of the vehicle joins to the outside wall 7c which forms the rear bending portion 23 of the rear frame 7.

The lateral member 3 has the lateral member main body 30 which extends from the inside wall 7b of the rear frame 7 to the inside in the width direction of the vehicle, and has an approximately hat-shape which is opened upward in the cross sectional view, a stiffening member 40 which is layered on and joined to a bottom wall 30a of the lateral member main body 30, and a blocked plate 48 blocking the side direction of the lateral member main body 30.

The end portion of the lateral member main body 30 outside in the width direction of the vehicle is welded to the inside wall 7b of the rear frame 7.

A tip portion of floor frame 4 is welded to the rear surface of a rear wall 30b of the lateral member main body 30.

Accordingly, the collision load applied on the rear frame 7 is dispersed with the floor frame 4 through the lateral member 3.

The rear wall 30b of the lateral member main body 30 is joined to the inside wall 7b forming the rear bending portion 23 of the rear frame 7.

Accordingly, the rear wall 3b of the lateral member 3, the bending bulkhead 24, and the stiffener 2d are arranged in the width direction of the vehicle (e.g., side-by-side), which extremely increases the rigidity of the rear bending portion 23.

As a result, it is suppressed that the collision load from the front direction, makes the rear bending portion 23 of the rear frame 7 smaller, which deforms the dash lower panel 111, to the inside of the vehicle.

Namely, even if the collision load from the front direction is applied, it can be prevented that an angle θ1 (see FIG. 2) of the rear bending portion 23 becomes smaller and the dash lower panel 111 moves to the rear direction (the inside of the vehicle).

As shown in FIG. 5, the stiffening member 40 is joined to the upper surface of the bottom wall 30a of the lateral member main body 30 inside in the width direction of the vehicle.

A bolt penetrating hole 45 which penetrates in the vertical direction is formed on the stiffening member 40.

Figure 6:
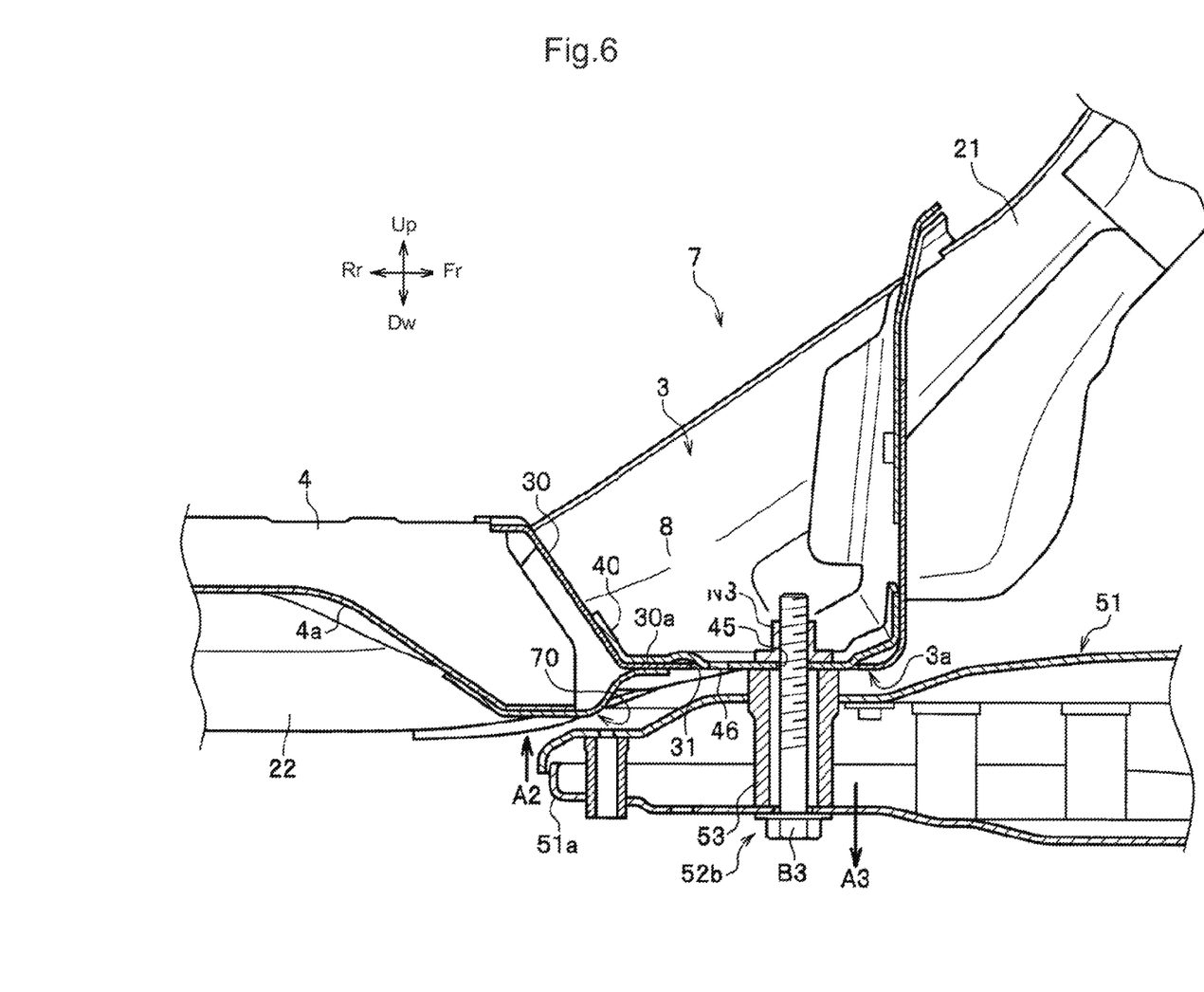
FIG. 6 is an enlarged view of the cross section of the lateral member in FIG. 2.
Figure 8A:
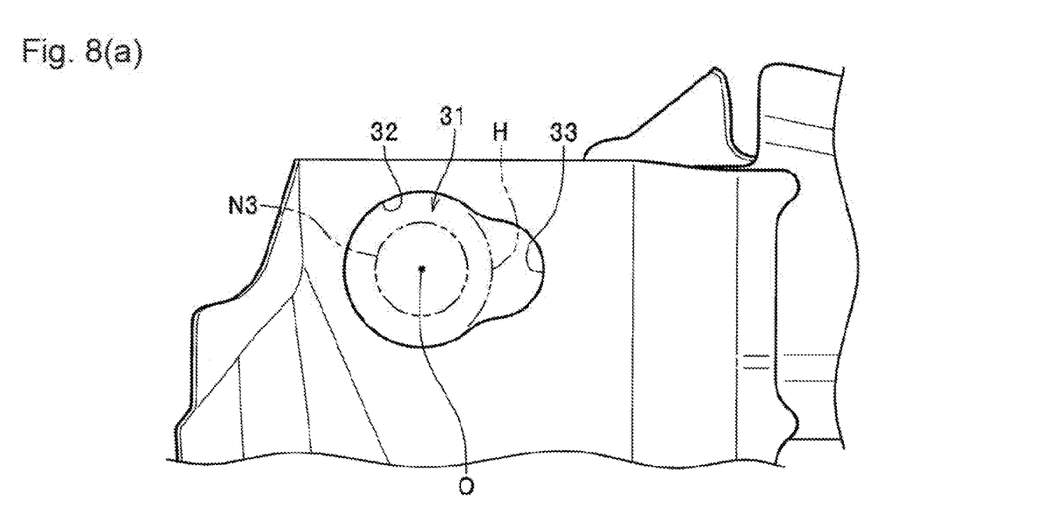

Moreover, as shown in FIG. 6, a hole portion 31 is formed at the part corresponding to the lower direction of the bolt penetrating hole 45 on the bottom wall 30a of the lateral member main body 30 (see FIG. 8(a)).

Then, a shaft portion of a fastening bolt B3 penetrates the bolt penetrating hole 45 and the hole portion 31 from the lower direction, and is screwed with a fastening nut N3 which is disposed above the stiffening member 40.

As a result, a rear fastened portion 52b of the sub frame 5 is attached under bottom wall 3a of the lateral member 3.

As mentioned above, a sub frame attaching portion 8 has the bottom wall 30a of the lateral member main body 30 and the stiffening member 40. Moreover, the detail of the sub frame attaching portion 8 will be described later.

As shown in FIG. 5, the blocked plate 48 is a tabular member extending in the vertical direction and the longitudinal direction.

The front wall 48a extending to the outside in the width direction of the vehicle is formed on the front end edge of the blocked plate 48, and the rear wall 48b extending to the outside in the width direction of the vehicle is formed on the rear end edge of the blocked plate 48. The front wall 48a is jointed to a front wall 30c of the lateral member main body 30. The rear rear 48 is joined to the rear wall 30b of the lateral member main body.

Moreover, the blocked plate 48 is disposed on the stiffening member 40. The lower end of the blocked plate 48 is joined to the stiffening member 40.

Accordingly, the inside of the lateral member 3 in the width direction of the vehicle is blocked, which increases rigidity of the lateral member 3.

As shown in FIG. 6, an abutting member 70 projecting below the bottom wall 3a is disposed below bottom wall 3a of the lateral member 3.

Figure 7:
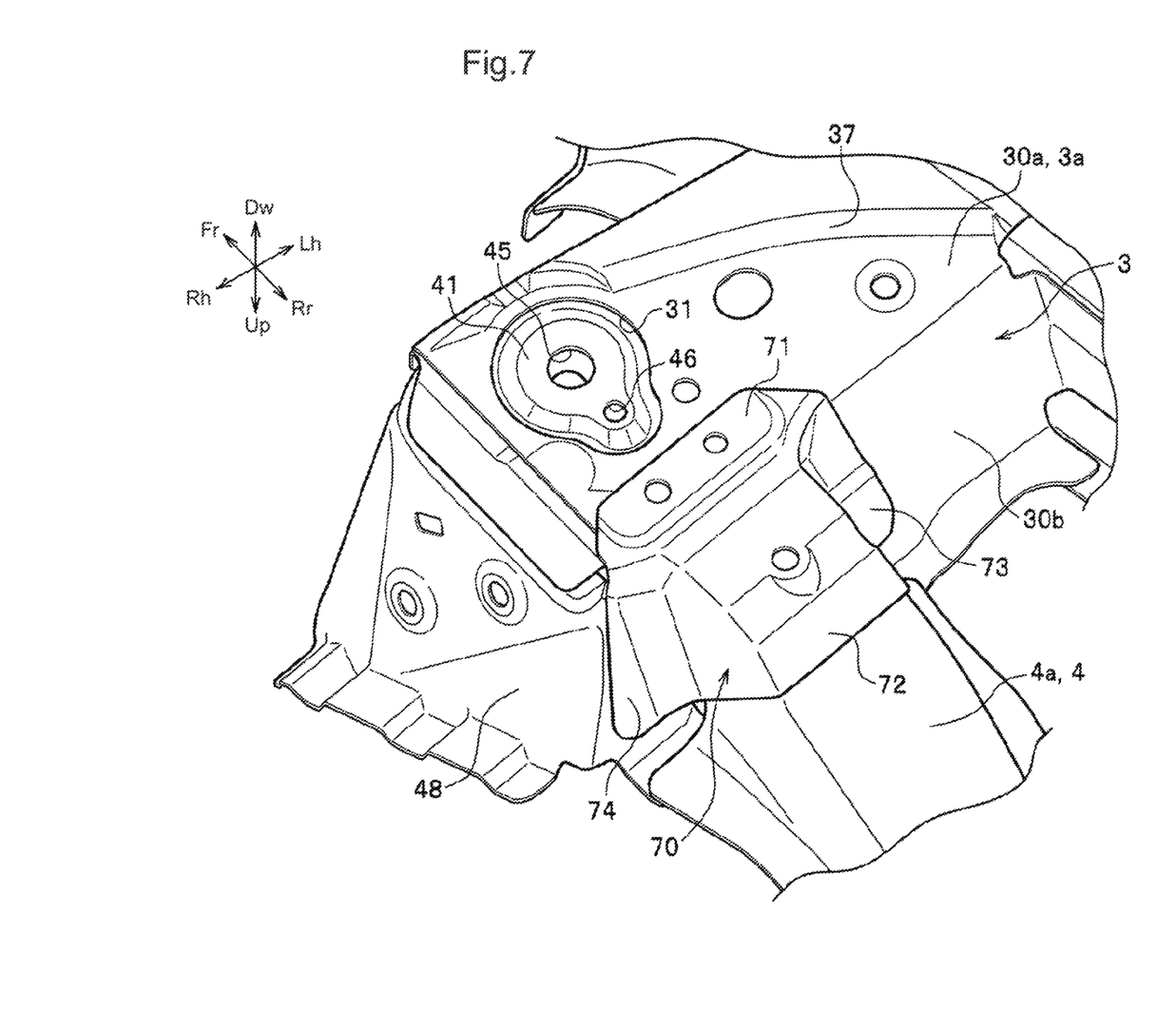
FIG. 7 is a perspective view of the lateral member, the floor frame, and the abutting member, which is seen from the rear lower side and from the inside in the width direction of the vehicle.

As shown in FIG. 7, the abutting member 70 is a member extending over the lateral member 3 and the floor frame 4.

Moreover, a front end portion 71 of the abutting member 70 is joined to the lower surface of the bottom wall 3a of the lateral member 3. A rear end portion 72 of the abutting member 70 is welded on the lower surface of a bottom wall 4a of the floor frame 4.

Accordingly, the abutting member 70 strengthen the connection between the lateral member 3 and the floor frame 4.

Moreover, the abutting member 70 is positioned behind the bolt penetrating hole 45 of the bottom wall 3a of the lateral member 3. Accordingly, as shown in FIG. 6, as below mentioned, a rear end 51a of an extended arm 51 of the subframe 5 is disposed under the abutting member 70.

Moreover, the abutting member 70 is separated from the rear end 51a of the extended arm 51. Accordingly, the vibration during travelling does not. make the contact between the rear end 51a of the extended arm 51 and the abutting member 70, which allows to secure the quietness.

As shown in FIG. 1, the sub frame 5 has an arm main body 50 which is positioned on the center portion in the width direction of the vehicle and has an approximately rectangular shape in the plane view, right and left, extended arms 51, 51 extended frontward from the side portion of the arm main body 50, and an auxiliary arm 52 interposed between the right, and left extended arms 51, 51.

The right and left extended arms 51, 51 gradually become narrower (e.g., closer to each other) as approach to the rear direction, the rear end 51a of the extended arm 51 is offset to further inner side than the front side frame 1 in the width direction of the vehicle.

A front fastened portion 52a is formed on the front end portion of the extended arm 51. The rear fastened portion 52b is formed on the rear end portion of the extended arm 51.

The front fastened portion 52a arid the rear fastened portion 52b have a cylindrical fastened tool 53 which opens to the vertical direction so as to he aisle to fasten in the vertical direction (see FIG. 6).

As shown in FIG. 2, the front fastened portion 52a is fastened to the front attaching arm 55 by a fastener (see a fastening bolt B1 in FIG. 1).

As shown in FIG. 6, the rear fastened portion 52b is fastened to the sub frame attaching portion 8 of the lateral member 3 by the fastening nut N3 and the fastening bolt B3.

Moreover, the extended arm 51 is connected with the front side frame 1 and the lateral member 3. When the front frame 6 receives the collision load from the front direction of the vehicle and bends (see FIG. 3), the backward load is applied on the tip of the extended arm 51 through the front attaching arm 55. Accordingly, the load is applied on the extended arm 51 so as to be compressed in the longitudinal direction.

Moreover, as shown in FIG. 2, the middle attaching arm 56 extending upward is connected on the center portion of the extended arm 51 in the longitudinal direction. The fastener (see the fastening bolt B2 in FIG. 1) connects the upper end of the middle attaching arm 56 with the bracket 57.

A center bending portion 54 recessed downward is provided on the upper wall of the extended arm 51.

Accordingly, when the load is applied on the extended arm 51 so as to foe compressed in the longitudinal direction, the extended arm 51 is valley folded at the center bending portion 54 as a starting point, and the vicinity of the center portion is shifted downward (see a M51 shown in a two-dot chain line in FIG. 2).

Moreover, when the extended arm 51 is valley folded, the downward load is applied on the middle attaching arm 56. The middle attaching arm 56 is detached from the bracket 57 (see an arrow A1).

As shown in FIG. 6, when the extended arm 51 is valley folded, the rear portion side or the extended arm 51 is inclined at the rear fastened portion 52b as a starting point. The rear end 51a of the extended arm 51 shifts upward and abuts on the abutting member 70 (see an arrow A2).

Then, when the extended arm 51 is folded largely, the rear portion side of the extended arm 51 is inclined at the rear end 51a of the extended arm 51 as a starting point which abuts on the abutting member 70.

Accordingly, due to the principle of leverage, the downward load is applied on the rear fastened portion 52b of the extended arm 51 (see an arrow A3).

Next, the sub frame attaching portion 8 will be explained.

As shown in FIG. 8(a), the hole portion 31 formed on the bottom wall 30a of the lateral member main body 30 has a circular-shape circular hole 32 which is concentric around a center axis O of the fastening bolt B3, and a notched portion 33 which notches the rear end edge of the circular hole 32 in a semicircular shape.

Moreover, an auxiliary line H shows the boundary between the circular hole 32 and the: notched portion 33 in FIG. 8(a).

Moreover, the diameter of the circular hole 32 expands larger than the outer diameter of the fastening nut N3.

Figure 8B:
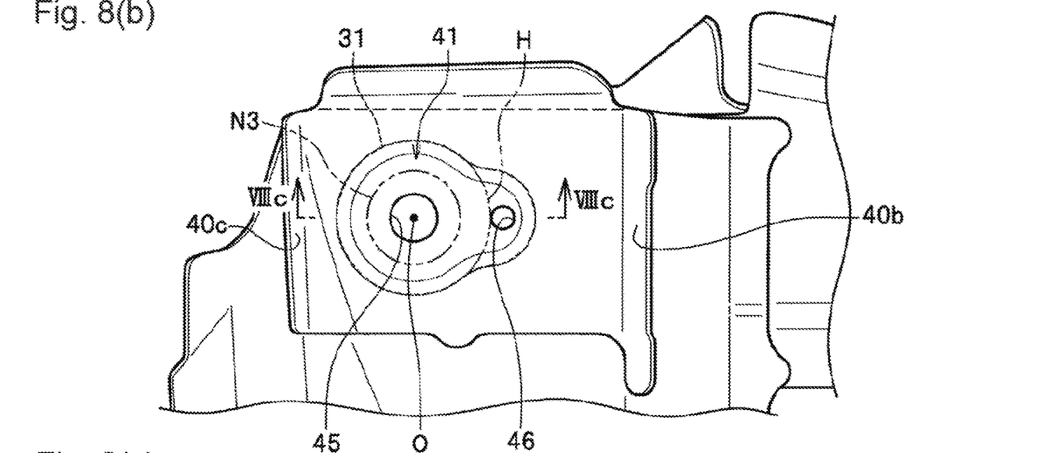
Figure 8C:
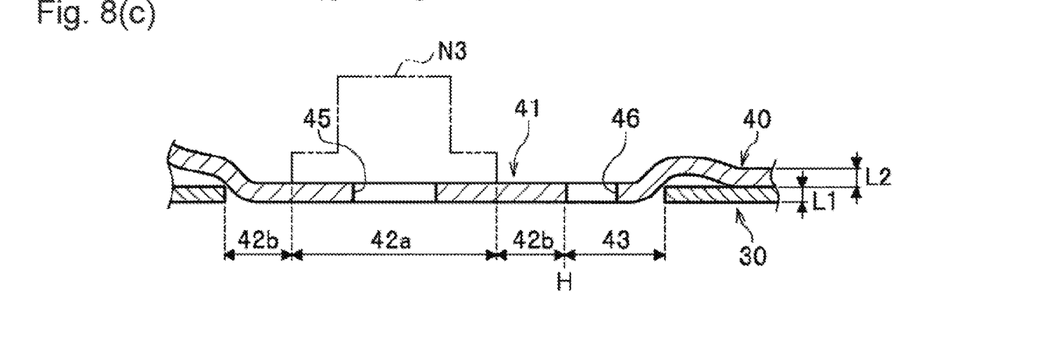

Accordingly, as shown in FIG. 8(c), only the stiffening member 40 is fastened to the fastening hut N3 and the fastening bolt B3.

As shown in FIGS. 8(b), 8(c), a recessed wall portion 41 which is recessed downward corresponding to the hole portion 31 and has a same shape with the hole portion 31 in the plan view is formed on the stiffening member 40.

The bolt penetrating hole 45 through which the shaft portion of the fastening bolt B3 penetrates relative to the center axis O of the fastening bolt B3, and a drain hole 46 formed corresponding to the notched portion 33 are formed on the recessed wall portion 41.

Accordingly, as shown in FIG. 8(c), the recessed wall portion 41 has an annular fastened portion 42a fastened by a fastening nut N3 which is provided in the upper direction, an annular weak portion 42b positioned inside the circular hole 32 and surrounding the periphery of the fastened portion 42a, a recessed portion 43 for notching, which is positioned inside the notched portion 33 and has the drain hole 46.

As mentioned above, according to the above-mentioned principle of leverage, the downward load is applied on the rear fastened portion 52b of the extended arm 51, and the downward load is applied on the fastened portion 42a fastened by the fastening nut N3.

Then, in the periphery of the fastened portion 42a, the shearing stress concentrates on a weak portion 42b which is made of a single layer and fragile relative to a load in the vertical direction, and the weak portion 42b is shear fractured.

Accordingly, the fastened portion 42a and the fastening bolt B3 fall off to the lower direction. The rear fastened portion 52b of the sub frame 5 and the lateral member 3 are disconnected, and the engine (not shown) falls off to the lower direction, which prevents the engine from intruding the vehicle.

Furthermore, the stiffening member 40 forming a weak portion 42b is made of a material with lower tensile strength than the lateral member main body 30. The fastening nut N3 falls off more easily with smaller load than the case that the stiffening member is formed with the lateral member main body 30. Accordingly, the sub frame 5 and the lateral member 3 are certainly disconnected.

Moreover, the drain hole 46 is formed on the recessed portion 43 for notching, which does not decrease the rigidity of the weak portion 42b, unnecessarily.

Next, the configuration of the hole portion 31 and the recessed wall portion 41 will be explained.

As shown in FIG. 8(c), a thickness L2 of the stiffening member 40 is thicker than a thickness L1 of the lateral member main body 30. Accordingly, the rigidity is increased at the part where the bottom wall 30a of the lateral member main body 30 and the stiffening member 40 are layered.

Accordingly, the sub frame attaching portion 8 is hardly deformed relative to the load to the horizontal direction through the recessed wall portion 41, and can stably support the sub frame 5.

As shown in FIG. 5, a joined portion 40b is formed on the rear end edge of the stiffening member 40 so as to be joined, to the rear wall 30b of the lateral member main body 30. A joined portion 40c is formed on the front end edge of the stiffening member so as to be joined to and the front wall 30c of the lateral member main body.

Moreover, a periphery stiffening portion 43 is formed on the blocked plate 48 so as to be extended along the periphery of the recessed wall portion 41 and joined to the stiffening member 40.

Accordingly, even though the sub frame attaching portion 8 is positioned so as to be offset from the front side frame 1, and the rigidity in the periphery of the sub frame attaching portion 8 is increased, which can stably support the sub frame 5.

As shown in FIGS. 5 and 7, a ridgeline 37 is formed on the lateral, member 3 so as to be gradually positioned from the front direction of the recessed wall portion 41 to the rear direction as the ridgeline approaches to the front side frame 1.

Moreover, the ridgeline 37 is formed on both of the lateral member main body 30 and the stiffening member 40, at the region where the lateral member main body 30 and the stiffening member 40 are layered.

Accordingly, even if the load is applied on the lateral member 3 from the sub frame 5 to the rear direction, the load is dispersed with the front side frame 1 (the rear frame 7) by the ridgeline 37.

Accordingly, the lateral member 3 prevents the deformation to move backward, the sub frame 5 bends certainly. Namely, the fastening nut N3 certainly falls off from the lateral member 3.

As mentioned above, according to the embodiment, the hole portion 31 of the lateral member 3 has the notched portion 33 in addition to a large-diameter hole (the circular hole 32 in the embodiment) which corresponds to an escape hole of the conventional art. Accordingly, the notched area is enlarged, which achieves the redaction of the lateral member 3 in weight.

Moreover, the drain hole 46 is formed on the lateral member 3, and the lateral member 3 is hardly getting rusty.

As mentioned above, the embodiment had been explained. However, the present invention is not limited to the embodiment.

For example, the embodiment adopts the circular hole 32 in a circular shape as the large-diameter hole. However, in the present invention, the large-diameter hole may adopt a rectangular shape. The shape of the large-diameter is not particularly limited. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A vehicle body front structure comprising:
a front side frame extending in a vehicle longitudinal direction;
a lateral member extending from a rear portion of said front side frame to an inner side in a vehicle width direction;
a sub frame disposed below said front side frame; and
a sub frame attaching portion provided on a bottom wall of said lateral member and fastening a rear end portion of said sub frame,
wherein said lateral member comprises:
a lateral member main body including a bottom wall including a hole portion formed therein,
a stiffening member disposed on the bottom wall of the lateral member main body and joined to an inside of the lateral member main body, the stiffening member being made of a material with lower tensile strength than said lateral member main body, wherein a fastening nut is disposed on the stiffening member,
said hole portion of the lateral member main body has a large-diameter hole with a larger diameter than a diameter of said fastening nut, and a notched portion notching an circumferential edge of said large-diameter hole,
said stiffening member has a recessed wall portion recessed downward corresponding to said hole portion,
and said recessed wall portion includes a drain hole corresponding to said notched portion.

2. The vehicle body front structure according to claim 1, wherein said lateral member has a blocked, plate blocking a side end of said, lateral member main body,
said lateral, member main body has an approximately hat-shape which is opened upward, in side view,
said stiffening member is joined to a front wall, a rear wall, and a bottom wail of said lateral member main body,
said blocked plate has a periphery stiffening portion extending along a periphery of said recessed wall portion and joined.

3. The vehicle body front structure according to claim 1, wherein the vehicle body front structure comprises:
a floor frame extending from said lateral member to a rear direction;
an abutting member joined to said lateral member and said floor frame, and projecting to a lower direction,
said sub frame is formed such that a longitudinal center portion bends in an L-shape in the side view so as to bend downward, at the time of collision from a front direction,
as said sub frame bends, a rear end of said sub frame shifts upward so as to abut on said .abutting member with a fastened portion as a fulcrum which is fastened by a fastening bolt.

4. The vehicle body front structure according to claim 3, wherein the lateral, member includes a ridgeline extending from a portion, in front of the recessed wall portion toward the front side frame, the ridge line being inclined to the rear direction so as to be gradually positioned rearward as the ridgeline approaches to the front side frame.

5. The vehicle body front structure according to claim 1, wherein, said stiffening member is thicker than said lateral member main body.

6. The vehicle body front structure according to claim 1, wherein said front side frame includes a front frame having, in order from the front,
a clearance portion for avoiding contact with a wheel disposed outside in the vehicle width direction,
a front bending portion bending to the inner side in the vehicle width direction,
a recessed portion including an outside wall located outside in the vehicle width direction and recessed inward in the vehicle width direction.

7. The vehicle body front structure according to claim 6, wherein said front side frame includes a rear frame comprising:
an inclined portion extending downward from a rear portion of the front frame of said front side frame toward a rear direction;
a horizontal portion horizontally extending from a rear end of said inclined portion to the rear direction, a rear bending portion including an angular portion disposed at a boundary between said inclined portion and said horizontal portion,
a stiffener of an outrigger provided on an outer side in the vehicle width direction of said rear bending portion,
a rear wall of said lateral member provided on an inner side in the vehicle width direction of said rear bending portion,
a bending bulkhead provided inside said rear bending portion and aligned with said stiffener and the rear wall of said lateral member in the vehicle width direction.

8. The vehicle body front structure according to claim 1, wherein the recessed wall portion of the stiffening member has a contour-conforming to an outer shape of the hole portion, and is recessed downward into the hole portion, and the drain hole is disposed at a position inside a boundary of the notched portion.

9. The vehicle body front structure according to claim 1, wherein the fastening nut is disposed right above the hole portion.

10. The vehicle body front structure according to claim 2, wherein the periphery stiffening portion of the blocked plate is disposed on the stiffening member.

11. The vehicle body front structure according to claim 2, wherein the blocked plate is disposed at an inner end in the vehicle width direction of the lateral member.

12. The vehicle body front structure according to claim 4, wherein the stiffening member includes, the ridgeline.

13. A vehicle comprising the vehicle body front structure according to claim 1.

* * * * *